United States Patent [19]

Widdicombe

[11] 4,112,979
[45] * Sep. 12, 1978

[54] END CAP FOR PIPES

[75] Inventor: Derek Gordon Widdicombe, Huddersfield, England

[73] Assignee: Naylor Brothers (Clayware) Limited, England

[*] Notice: The portion of the term of this patent subsequent to Jun. 15, 1993, has been disclaimed.

[21] Appl. No.: 671,599

[22] Filed: Mar. 29, 1976

Related U.S. Application Data

[63] Continuation of Ser. No. 544,893, Jan. 28, 1975, Pat. No. 3,963,268.

[30] Foreign Application Priority Data

Jan. 31, 1974 [GB] United Kingdom ............... 4552/74

[51] Int. Cl.² ........................................... F16L 55/10
[52] U.S. Cl. .................................. 138/89; 138/96 R; 285/DIG. 2; 220/302; 220/306
[58] Field of Search ....... 285/330, DIG. 22, DIG. 14, 285/379, 345, 231, 369, 230, DIG. 2; 277/DIG. 2; 138/89, 96 R, 96 T; 215/346, 317; 220/306

[56] References Cited

U.S. PATENT DOCUMENTS

| 328,427 | 10/1885 | Nusbeck | 285/DIG. 2 |
| 1,644,153 | 10/1927 | Schriner | 285/330 X |
| 3,342,510 | 9/1967 | Walters | 285/379 X |
| 3,544,119 | 12/1970 | Glover | 285/345 X |
| 3,645,547 | 2/1972 | Glover | 285/345 X |
| 3,689,113 | 9/1972 | Blaschke | 285/DIG. 14 X |
| 3,920,270 | 11/1975 | Babb, Jr. | 285/DIG. 2 |
| 3,963,268 | 6/1976 | Widdicombe | 285/369 X |

Primary Examiner—Thomas F. Callaghan
Attorney, Agent, or Firm—Willis Bugbee

[57] ABSTRACT

An end cap for closing an open end of a pipe. The end cap is formed with a sleeve of plastics material closed at a first end by a wall and having tongues formed integrally with the sleeve on the opposite or second end. These tongues fit in openings in a plastics clamping ring at the second end of the sleeve and engage with a side of the ring to prevent removal of the clamping ring. The clamping ring holds a sealing ring of rubber material around the inside of the sleeve for sealing engagement with the pipe fitted into the sleeve through the second end of the latter.

8 Claims, 10 Drawing Figures

END CAP FOR PIPES

This is a continuation of my co-pending Application Ser. No. 544,893 filed Jan. 28, 1975, and issued June 15, 1976, under U.S. Pat. No. 3,963,268.

This invention concerns pipe couplings.

The invention is particularly concerned with couplings for connecting together pairs of plain-ended pipes, (i.e., non-socketed) formed for example of clayware, pitch fibre, asbestos cement, concrete, plastics material etc. used, for example, in sewers, drains and cable conduits.

An object of the invention is to provide a coupling which is efficient in use, relatively easy to assemble from its constituent parts, is of simple construction and can be manufactured with an economic use of plastics material.

According to the invention a pipe coupling comprises a tubular, open-ended sleeve formed of synthetic plastics material, a plurality of tongues provided at at least one end of the sleeve, a clamping ring formed with apertures in which said tongues extend, the tongues being provided with projections arranged to resist dislodgement of the clamping ring from the sleeve when the coupling is in use, a sealing ring of rubber or rubber-like material disposed in the sleeve for engagement with a pipe when inserted thereinto, and said sealing ring being engaged between said clamping ring and the sleeve.

The invention will now be further described with reference to the accompanying drawings in which:

FIG. 3 is an enlarged section on line III—III in FIG. 1 of a fragment of an end of the coupling;

FIG. 4 is a longitudinal section through a tongue of a fragment of an end of a modification of the coupling in FIG. 1;

FIG. 5 is a section of the modification in FIG. 4 but taken on a line comparable, in the modification, to that on which FIG. 3 was taken;

FIGS. 6 and 7 are sections comparable with those in FIGS. 4 and 5 respectively, but of a further modification of the coupling in FIG. 1;

In the drawings like references refer to like parts.

Figure 1:
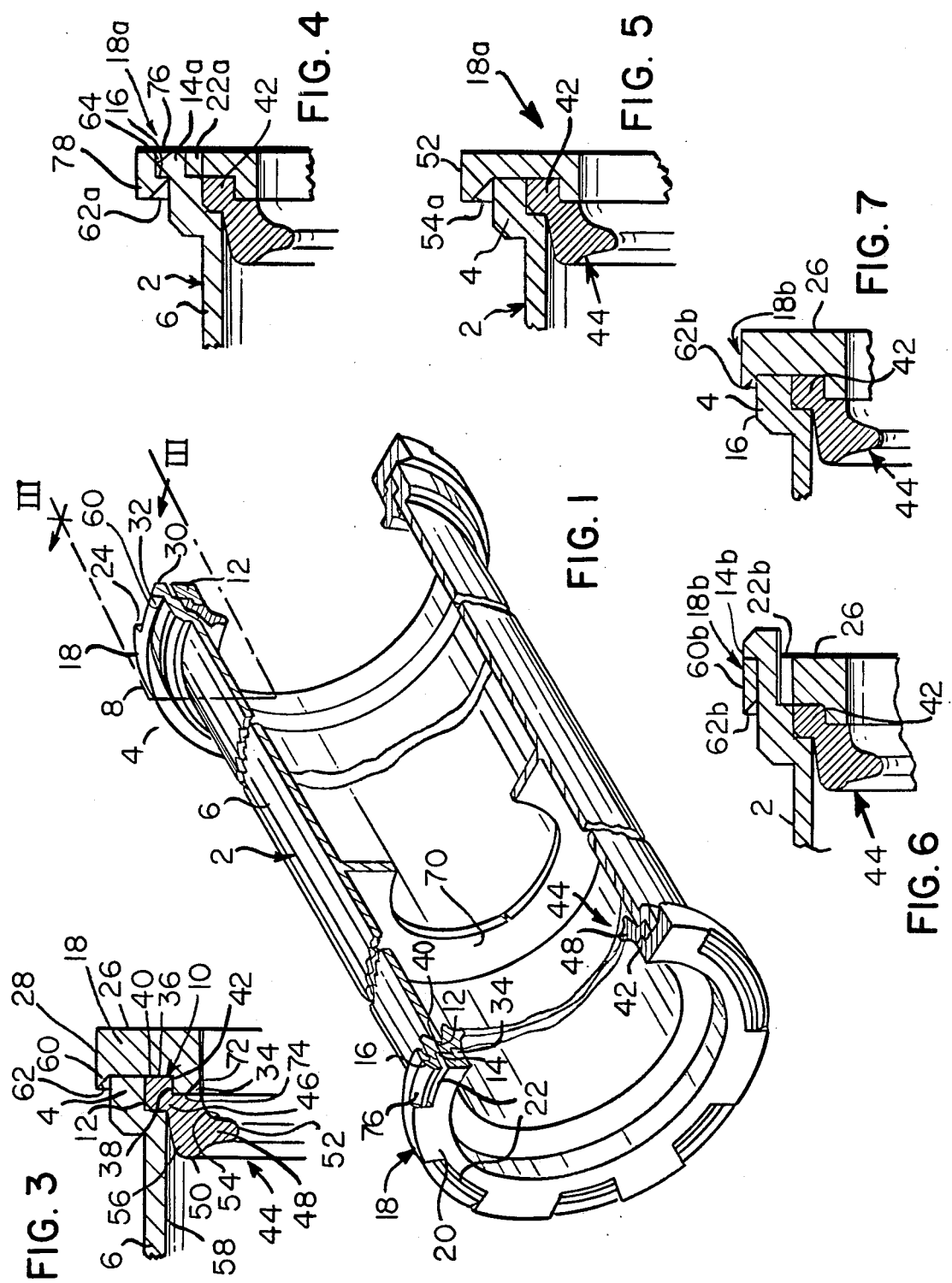
FIG. 1 is a perspective view, in section, of a pipe coupling formed according to the invention.
Figure 2:
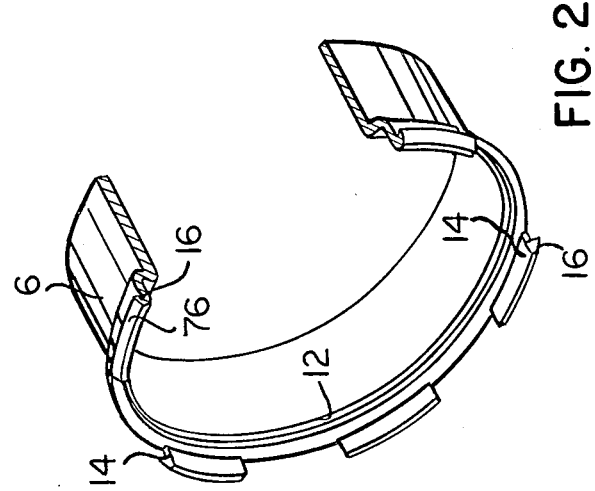
FIG. 2 is a perspective end view in section, of a fragment of the sleeve in FIG. 1.

Referring to FIGS. 1 to 3, the pipe coupling is formed with an open ended tubular sleeve 2 of substantially circular cross-section and generally cylindrical shape moulded from plastics material. The thickness of the sleeve wall is increased at both ends 4 so that at each end the external diameter of the sleeve is greater than the external diameter of a central portion 6 of the sleeve.

At each end 4, the internal diameter of the sleeve is increased by an annular recess 10 (FIG. 3) formed in the wall of the sleeve at the mouth thereof so that a radially extending side 12 of the recess faces outwardly of the sleeve in a substantially axial direction.

A plurality of spaced tongues 14, moulded integrally with the sleeve 2, extend outwardly from each end 4 in a substantially axial direction. A projection 16 is formed on the free end of each tongue and extends in a direction generally radially outward of the sleeve.

A substantially circular clamping ring 18 which can be moulded from synthetic plastics, is fitted onto each end of the sleeve. This ring has a radial wall 20 in which are formed a plurality of through apertures 22 in each of which extends a tongue 14, the projection 16 thereon being located in a notch 24 formed in rear face 26 of the wall 20 and extending from the aperture 22 to the outer peripheral face 28 of the ring. In this way the projections 16 are countersunk into the rear face 26 of the clamping ring. To enable the clamping ring to be push fitted onto the sleeve, the tongues 14 are deformable radially inwardly until the projections have passed through the apertures 22, whereupon the tongues resiliently snap back to adopt their former attitudes to locate the projections 16 in the notches 24 with a front face 30 of a projection 16 immediately in front of a rear face 32 of the corresponding notch. Therefore each projection engages the rear face 32 of the corresponding notch and prevents dislodgement of the sleeve when force is applied to the clamping ring in an axial direction outwardly of the sleeve. The size of each aperture 22 is such as to enable the corresponding projection 16 to pass through the aperture when the ring is being fitted onto the sleeve.

Alternatively, the tongues 14 may be relatively rigid compared with the sides of the clamping ring defining the apertures 22 so that the clamping ring 18 deforms to allow passage of the projections and then resiliently resumes its normal shape upon the projections 16 locating in the notches 24. Or the tongues 14 and clamping ring 18 can be mutually deformable and resiliently resume their normal attitudes when the projections 16 locate in the notches 24.

An annular flange 34 extending substantially axially inwardly of the sleeve is formed on the radial wall 20 of the clamping ring at the radially inner periphery of the wall. Thus between a front face 36 of the wall 20, a radially outermost face 38 of the flange 34, the side face 12 and a radially outermost face 40 of the recess 10, there is defined an annular groove of substantially square cross-section in which is located an annular collar 42 of similar shape to the groove. This collar, clamped in place by the clamping ring, forms an integral part of a sealing ring 44 moulded from a rubber or rubber-like material. This annular groove opens at a radially inner corner into the interior of the sleeve 2 and a neck portion 46 of the sealing ring extends through this opening. The sealing ring is formed with a sealing beading 48 adjoining the collar 42. The sealing beading is of approximately triangular shape in radial cross-section. Corners 50 and 52 of the beading remote from the collar 42 are rounded, and the corner 52 points generally radially inwardly of the sleeve and is at an end of a nose portion which has generally concave side walls 54. A radially outermost face 56 of the beading is adjacent to an inner face 58 of the sleeve 2 against which face 58 the beading is pressed when a pipe (not shown) is inserted into an end of the coupling. A rear face 72 of the beading lies against a front face 74 of the flange 34.

When an end of a pipe is inserted into an end of the coupling, the beading 48 is compressed sufficiently between the inner face 58 of the sleeve 2 and the pipe to provide a water-and air-tight seal between the pipe and coupling.

The tongues 14 can be arcuate in radial cross-section, and at each end of the sleeve can be substantially equally spaced apart. The arc length of each tongue 14 can be substantially equal to the arc length of the spaces therebetween. The apertures 22 in the clamping ring can also be arcuate in radial section and spaced by distances substantially equal to the spacing between adjacent tongues.

Figure 8:
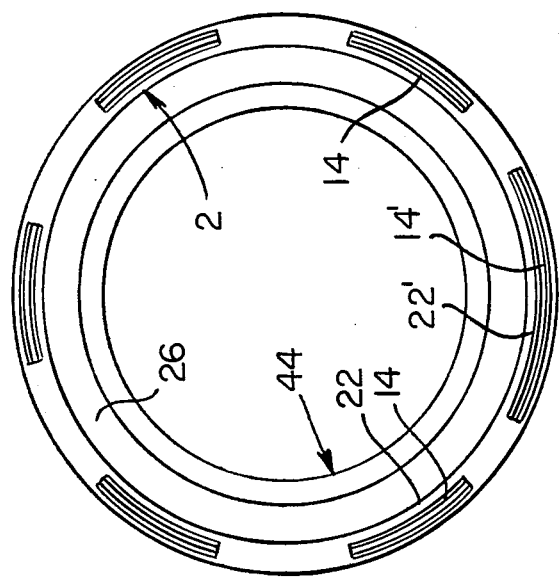
FIG. 8 is an end view on an enlarged scale of another modification of the coupling in FIG. 1.

If desired the spacing between a pair of tongues on an end of the sleeve and/or the shape and/or the size of one or more of the tongues, can differ from the others at that end, and the apertures in the clamping ring arranged appropriately so that the ring can only be fitted in one position on the end of the sleeve. Such an arrangement can be seen in FIG. 8 in which the tongue 14' is enlarged relative to the others and the spacing between it and the tongues adjacent thereto is less than that between other tongues. The size of aperture 22' in which the tongue 14' is located is correspondingly increased.

The projections 16 can each have a chamfered rear face 76 at an end thereof to permit ease of fitment of the clamping ring over the projections.

The clamping rings can each be formed with a second axially extending flange 60 at the outer periphery of the ring and extending over the end 4. The flange 60 can have a chamfered front face 62 to slide more easily over the projections 16 when the ring is being fitted into place, particularly when the latter are chamfered at 76.

In the arrangement shown in FIGS. 4 and 5, the tongues 14a are located in apertures 22a in a clamping ring 18a. The projections 16, which are countersunk in the clamping ring, each engage an internal shoulder 64 in the aperture 22a, which shoulder is on a radial flange 78 which has a chamfered front face 62a. In FIGS. 4 and 5, the flange 78 not only extends over the enlarged end 4 but is also in contact therewith.

In FIGS. 6 and 7, the tongues 14b are relatively long and the projections 16 engage the rear face 26 of the clamping ring 18b, the tongues extending through apertures 22b in the ring which has an outer axial flange 60b chamfered at 62b.

If desired the arrangement of the tongues and clamping ring may only be provided at one end of the sleeve.

An internal radially extending annular flange 70 can be provided intermediate the ends of the sleeve 2 (as shown in FIG. 1) to prevent ends of pipes inserted into the sleeve touching one another.

The plastics material used for the sleeve 2 and clamping ring 18, 18a or 18b is a semi-resilient material and can be a polypropylene copolymer, or polypropylene, acrylonitrile-butadiene-styrene, unmodified or modified "rigid" polyvinyl chloride, polycarbonate, polyacetal or polyethylene.

The sealing ring 44 can be formed from natural or synthetic rubber.

In the arrangements described above, the holding of the clamping ring by tongues in apertures in the ring prevents rotation of the latter when the coupling is in use. The engagement by the projections 16 prevents dislodgement of the clamping ring when buried pipes coupled together by the coupling move relative one to another due to ground movements.

The clamping ring requires no grooves of an undercut character to be molded therein, consequently molding of the ring is easier since the molding operation requires neither the use of costly collapsible tools, nor does the clamping ring have to be sprung off a mold part which action can distort a molded ring.

If desired the sleeve and clamping ring can be of any suitable desired shape in diametrical cross-section.

Figure 9:
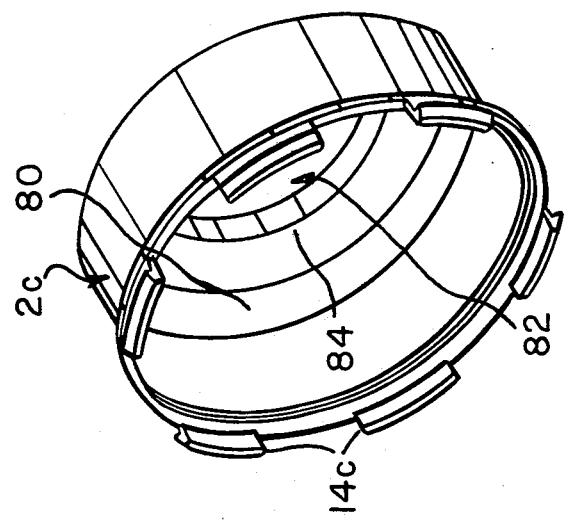
FIG. 9 is a perspective view of the sleeve of a modification of the coupling in FIG. 1, for use in connecting pipes of different diameters.

In the modification in FIG. 9 the sleeve 2c has tongues 14c on only one end, a clamping ring (not shown) as described above with reference to any of FIGS. 1 to 8 being fitted on the tongues to hold in place a sealing ring (not shown) as described above. A transverse wall 80 is provided on the other end of the sleeve and is formed with opening 82 in which a rubber grommet 84 is located. This coupling is for connecting together two pipes of different diameters, the pipe of smaller diameter being fitted through the opening 82 and engaged by the grommet.

Figure 10:
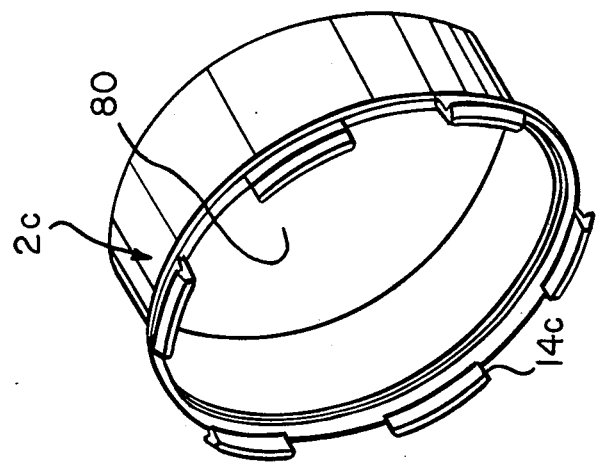
FIG. 10 is a perspective view of an end cap for a pipe which end cap is formed by modifying the sleeve of the coupling in FIG. 9.

In FIG. 10 an end cap for a pipe is shown in which the end wall 80 of the sleeve 2c has no opening formed therein.

What is claimed is:
1. An end cap for a pipe, comprising
   a tubular sleeve of synthetic material having opposite first and second ends,
      said sleeve being closed at said first end by a wall extending transversely across the sleeve and being open at said opposite second end,
      said sleeve at said second end having a plurality of spaced tongues extending substantially parallel to the axis of the sleeve,
         each tongue being formed with a projection which extends therebeyond,
            each projection also extending transversely to the corresponding tongue in a radial direction with respect to the longitudinal axis of the sleeve,
   a clamping ring having a body formed with spaced through apertures in which the tongues are adapted to extend,
      said apertures being wide enough in a radial direction relative to the longitudinal axis of the sleeve for the clamping ring to be push-fitted on the tongues by movement of the clamping ring towards said second end of the sleeve during which the projections enter the apertures first,
      said clamping ring having a face portion facing away from said sleeve,
         each projection having a face portion facing towards the first end of the sleeve and abutting against said face portion of said clamping ring,
            said abutting face portions being in substantially the same plane and extending substantially perpendicular to the longitudinal axis of the sleeve whereby movement of the clamping ring along the said axis in a direction away from the sleeve is prevented,
      said second end of said sleeve and said clamping ring defining between them an annular recess,
   and a sealing ring of rubber-like material clamped in said annular recess between said clamping ring and said second end of said sleeve,
      said sealing ring comprising a collar and an annular beading attached to the collar and extending around an inside of the sleeve for engaging an end of a pipe inserted into the sleeve through said second end of said sleeve.
2. An end cap, as claimed in claim 1, in which the projections abutting said face portions of the clamping ring are disposed in the body of the clamping ring.

3. An end cap, as claimed in claim 2, in which the clamping ring is formed with notches, each notch extending into a respective aperture, and each projection being disposed in a respective notch.

4. An end cap, as claimed in claim 2, in which each of said face portions on the clamping ring is disposed on a respective shoulder formed in said body.

5. An end cap, as claimed in claim 1, in which the clamping ring is deformable from a normal attitude as the clamping ring is pushed onto the tongues, whereby when the clamping ring is pushed to a predetermined position on the tongues, the clamping ring can resiliently return to the normal attitude whereat the projections are engaged by the clamping ring for preventing the removal thereof.

6. An end cap, as claimed in claim 1, in which the tongues are deformable from normal attitudes as the clamping ring is pushed onto the tongues, whereby when the clamping ring is pushed to a predetermined position on the tongues, the tongues can resiliently return to the normal attitudes whereat the projections are engaged by the clamping ring for preventing the removal thereof.

7. An end cap, as claimed in claim 1, in which each projection has a chamfered surface facing away from the sleeve, which chamfered surface contacts the clamping ring as the latter is pushed onto the tongues.

8. An end cap, as claimed in claim 1, in which the clamping ring has at least one chamfered surface which contacts the projections as the ring is pushed onto the tongues.

* * * * *